United States Patent [19]

Archer et al.

[11] Patent Number: 4,961,977
[45] Date of Patent: Oct. 9, 1990

[54] COMPOSITE ARTICLE

[75] Inventors: Joel Archer, Briec; Denis Van Wassenhove, Crepy-en-Valois, both of France

[73] Assignee: Textilver, S.A., Crepy-en-Valois, France

[21] Appl. No.: 194,802

[22] Filed: May 17, 1988

[30] Foreign Application Priority Data

May 18, 1987 [GB] United Kingdom ............... 87-11644

[51] Int. Cl.⁵ ............................................. F16L 11/02
[52] U.S. Cl. .................... 428/36.3; 428/36.1; 428/256; 428/257; 428/262; 523/205; 523/209; 523/222; 138/123; 138/124; 138/125
[58] Field of Search ............... 428/375, 374, 394, 395, 428/36.3, 36.9; 523/205, 209, 222; 138/123, 124, 125

[56] References Cited

U.S. PATENT DOCUMENTS

| | | |
|---|---|---|
| 3,253,619 | 5/1966 | Cook et al. |
| 3,755,061 | 8/1973 | Schurb ................................ 161/143 |
| 3,939,024 | 2/1976 | Hoggatt . |
| 4,313,999 | 2/1982 | Hughes . |
| 4,614,678 | 9/1986 | Ganga ................................... 428/74 |
| 4,713,139 | 12/1987 | Ganga . |
| 4,754,794 | 7/1988 | Bocquet .............................. 152/527 |
| 4,764,427 | 8/1988 | Hara et al. .......................... 428/375 |

FOREIGN PATENT DOCUMENTS

| | | |
|---|---|---|
| 963789 | 3/1979 | Canada . |
| 0133825 | 6/1983 | France . |
| 1199808 | 7/1967 | United Kingdom . |
| 1310350 | 10/1970 | United Kingdom . |
| 1346997 | 7/1971 | United Kingdom . |
| 1389267 | 6/1972 | United Kingdom . |
| 1310354 | 3/1973 | United Kingdom . |
| 2055709 | 8/1980 | United Kingdom . |
| 2073360 | 10/1981 | United Kingdom . |
| 2103992 | 8/1983 | United Kingdom . |
| 2163513 | 12/1984 | United Kingdom . |
| 185460 | 6/1986 | United Kingdom . |
| 790676 | 6/1988 | United Kingdom . |

OTHER PUBLICATIONS

Undated paper titled: Engineering with Long Fibre Thermoplastic Composites.

Primary Examiner—George F. Lesmes
Assistant Examiner—Jill M. Gray
Attorney, Agent, or Firm—John T. Synnestvedt; Charles H. Lindrooth

[57] ABSTRACT

Composite articles comprising a matrix material and reinforcing fibres coated individually or in tows with a support layer and methods of making the same are disclosed. The support layer is capable of supporting the fibres and preventing kinking thereof when the article is deformed while the matrix material is relatively soft. Polymeric matrix and support layer materials, either thermoplastic or thermosetting, are disclosed. When the support layer comprises a thermoplastic material, it should be selected to have a softening temperature which is higher than any temperature to which the article is heated for deformation. If matrix material and support layer are thermoplastic, the materials should be selected so that the softening point of the support layer is at least 10° C. higher than that of the matrix, especially at least 30° C. higher. According to the disclosure, the fibres are arranged so as to deform in a trellis deformation when the article is deformed. For example, when the article is a sheet, the fibres will be woven; when the article is tubular, the fibres will be braided. Ratios by volume of matrix material to material of the support layer of less than 50% and preferably from 20% to 40% and of fibres to matrix and support material greater than 20% and more, preferably from 40 to 60%, are given. The articles may be made heat recoverable by crosslinking the matrix material after consolidation. The matrix material may be applied to the fibres individually or in tows after the fibres are coated with the support layer. Thus a disclosed method involves steps of braiding, weaving or otherwise arranging the coated fibres into an article and thereafter consolidating the matrix material. Alternatively, the method may involve providing the matrix as a sheet laminated with the fibres of the article and then heated to cause it to melt and impregnate the article. The method may additionally comprise heating the previously formed article to a temperature above the softening point of the matrix material but at which the support layer will support the fibres to prevent kinking of the fibres and then deforming the article.

6 Claims, 1 Drawing Sheet

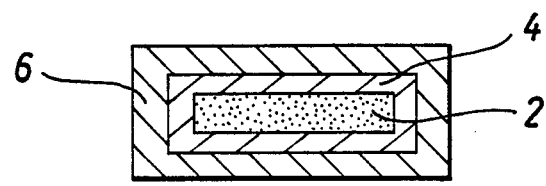
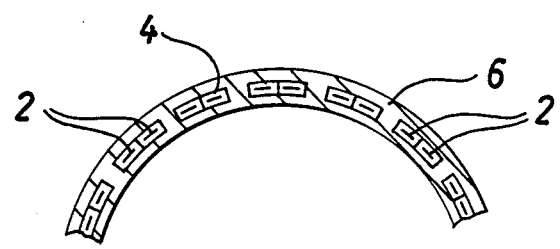

COMPOSITE ARTICLE

This invention relates to a composite article, a coated fibre for forming a composite article, a method of making a composite article and a method of deforming a composite article.

Composite articles that comprise a matrix, generally a polymeric matrix, and reinforcing fibres, are widely used as parts of various mechanical equipment, for example as panels, beams or conduits in environments where particular mechanical properties, heat-resistance and light weight are desirable.

The fibres used to reinforce composite articles may be short fibres, or long continuous fibres, the latter being preferred for the mechanical properties that they can confer on the resulting article.

In the manufacture of composite articles, it is often desirable to use molding or deformation techniques for example to create a panel with a particular desired profile or to bend a beam or conduit. When continuous reinforcing fibres are used, they follow such deformation by deforming in the trellis sense, by shear slipping or by wrinkling. However, wrinkling is generally undesirable since it reduces the mechanical strength of the article.

EP-A-185460 discloses a tubular composite article which is designed for deformation. It comprises braided reinforcing fibres that are impregnated with a cross-linked thermoplastic material. To deform the article, it is heated to a temperature at which the impregnating material is softened. When the article is deformed, the fibres will generally deform in the trellis sense, but when the article is deformed sharply, the fibres can in unfavourable circumstances be kinked.

The present invention seeks to reduce the tendency of the reinforcing fibres of a composite article to kink when the article is deformed by providing the fibres with a layer which allows deformation of the fibres in the trellis sense but inhibits kinking. By elimination of kinking of the fibres, performance of the deformed article is substantially more predictable.

Accordingly, the invention provides a composite article comprising a matrix reinforced by fibres which are coated individually or in tows with a support layer, the support layer being capable of supporting the fibres when the article is deformed while the material of the matrix is relatively soft.

Thus the article according to the invention has the advantage that the reinforcing fibres are provided with a layer of material which supports the fibres transversely, thereby reducing their tendency to kink when the article is deformed. The provision of the support layer has the further advantage that it can promote keying of the matrix material to the reinforcing fibres.

The material of the matrix will generally be polymeric, and may be either a thermoplastic or a thermoset material. A thermoplastic material will generally be preferred since it allows full advantage to be taken of the repeated deformability of the article of the invention. Furthermore, thermoplastic materials do not suffer from the problems of limited shelf-life found with thermoset materials, nor do they require controlled time and temperature for cure. Another advantage of the use of a thermoplastic material for the matrix is that it allows a weld to be formed to the article.

In some circumstances, however, it may be advantageous to provide a matrix of a thermoset material, for example in order to take advantage of desirable mechanical or other properties. In this case, for example, a web of coated reinforcing fibres may be impregnated with two curable components of a thermoset material. The resulting article may then be deformed under heat and pressure which also initiates cure of the matrix material, the coating on the fibres reducing the incidence of kinking.

The material of the support layer on the fibres will generally be polymeric. It also may be thermoset or thermoplastic. When the support layer comprises a thermoplastic material, it should be selected to have a softening temperature which is higher than any to which the article is heated for deformation. Thus for example when the materials of both the matrix and the support layer are thermoplastic, the materials will be selected so that the softening point of the support layer is higher than that of the matrix, preferably at least 10° C. higher, especially at least 30° C. higher, a large temperature difference being preferred to reduce the chance of softening the support layer when the article is heated to soften the matrix for deformation.

The article of the invention is arranged to be deformable when the matrix material is relatively soft. The extent to which the matrix has to be softened will depend on a number of factors including the proportions of the materials of the article and the apparatus by which the article is deformed; the extent will be apparent to the man skilled in this art. When the matrix material is a thermoplastic polymer, it is preferred that it be softened by heating although other techniques may be used.

The reinforcing fibres in the article may be provided as individual filaments, or groups of filaments, generally known as tows. Fibres with an elongate cross-section may also be used, such as tapes. The fibres may be of aromatic polyamide material (such as that sold under the trademark Kevlar), or glass, carbon, boron, metal, ceramic or other inorganic material.

The support layer will be provided on the fibres individually or in tows. In some embodiments, each fibre need not be coated over its entire surface, provided that the support layer provides sufficient support for the tow to prevent kinking of the fibres thereof.

Coating of the fibres may be carried out by techniques such as solvent coating or coating in the melt. Melt coating for example by extrusion is particularly preferred for its simplicity and for the fact that it can be carried out continuously. When the fibres are arranged in tows, it is preferred that the tows be impregnated with the material of the support layer (whether applied by solvent or melt coating or any other technique) so that each of the fibres of the tow is coated substantially over its entire surface. Melt coating, especially extrusion, has the further advantages that the coating can conveniently be arranged to be even circumferentially of the fibres, and that additional additives, for example to promote crosslinking, flame retardation or heat stability can be incorporated conveniently.

The reinforcing fibres will preferably be arranged so as to deform in a trellis deformation when the article is deformed. For example, when the article is a sheet, the reinforcing fibres will preferably be woven; when the article is essentially tubular, the fibres will preferably be braided.

Suitable thermoplastic materials for use as the matrix include polymers and copolymers of olefins, especially ethylene and propylene, halogenated olefins such as polyvinylidene fluoride (Kyna TM) and chlorotrifluoroethylene (Tefzel TM), polyesters, polyamides, polyethersulphones and polyphenylene oxides. Low melting point metals and alloys, such as tin and lead, may also be used, particularly when the reinforcing fibres and/or the support layer comprise metallic material.

Suitable thermoset materials for the matrix include epoxy resins, urea formaldehydes and phenol formaldehydes.

Suitable materials for the support layer on the fibres include aromatic ether based polymers such as polyetherether ketons (PEEK), polyethersulphones, polyesters, polyamides, polyolefins especially polypropylene, high melting point metals such as aluminum.

Preferred combinations of materials of the matrix and support layer are shown in the table below:

|  | 1 | 2 | 3 |
|---|---|---|---|
| Matrix | High density polyethylene | Polyphenylenesulphone | Polyphenyleneoxide |
| Support layer | Polypropylene | PEEK | Polysulphone |

The materials of the fibres, the support layer and the matrix will be selected according to the desired properties of the composite article. For certain applications, it may be desirable to modify the properties of the support layer or the matrix, for example to modify the electrical, physical or chemical properties thereof, for example by incorporating appropriate additives. The electrical properties of the article may be modified if desired by incorporating conductive elements in the matrix to confer screening properties on the article. The conductive elements may be braided to permit deformation.

Preferably, the ratio by volume of matrix material to the material of the support layer in the consolidated article is less than 50%, more preferably from 20 to 40%. The provision of individual support layers on the fibres (or tows) allows the volume proportion of matrix material to be reduced compared with prior art articles. The overall increase in fibre content in articles of the invention confers greater load carrying ability.

Preferably the volume ratio of reinforcing fibres to matrix and support material combined is greater than 20%, more preferably from 40 to 60%. At higher fibre contents, the article is liable to delaminate during molding or deformation. At lower fibre contents, the mechanical properties of the article are relatively poor, and this can only be compensated for by increasing the size and weight of the article.

Preferably, the matrix material is crosslinked. This has the advantage that it allows deformation of the article with heat and only light pressure, since the tendency of the matrix material to sag when soft, which can result in deformation of the composite article, is reduced significantly. Crosslinking is preferably effected by means of ionising radiation, although other possibilities include heat and chemical reaction, for example using crosslinking agents.

In a preferred embodiment, the article of the invention may be arranged to be heat-recoverable. A recoverable article is one whose dimensional configuration may be made to change when subjected to an appropriate treatment, such as heat. Recoverable articles can be used to seal or to protect objects, the simplicity with which they can be installed being a particular advantage. The article of the invention may be made heat-recoverable by crosslinking the matrix after it has been consolidated, deforming the article when the matrix is soft, and cooling the article in its deformed configuration.

In another aspect, the invention provides a composite article which comprises a heat-recoverable matrix, and fibres reinforcing the matrix which are so arranged that on recovery of the matrix, the fibres are deformed substantially without kinking.

The invention also provides a method of making a composite article, which comprises forming the article from a matrix and associated reinforcing fibres which are coated individually or in tows with a support layer, and consolidating the matrix.

The matrix material is preferably provided initially as a coating on the fibres external of the support layer, so that the method comprises the simple steps of braiding, weaving or otherwise arranging the coated fibres so as to form the article, and consolidating the matrix material that is provided as the outer layer on the fibres.

In another embodiment, the method of the invention may involve forming the article from fibres that are coated only with a support layer, and then impregnating the article so formed with a matrix material. For example, the matrix may be provided as a sheet laminated with the fibres of the article, and then heated to cause it to melt and impregnate the fibres.

The support layer and the matrix material will preferably be provided on the fibre by coextrusion. When it is desired to use a thermoset material for the matrix, reactive components may be extruded or otherwise provided sequentially on the fibres.

In another aspect, the invention provides a coated fibre for forming a composite article, which comprises a fibre that is coated with an inner support layer and an outer layer of a matrix material, the inner and outer layers both being of thermoplastic material, the softening point of the inner layer being at least 10° C higher than that of the outer layer.

Preferably, the ratio of the volume of the outer layer to that of the inner layer is less than 50%.

Preferably, the method of the invention includes the step of crosslinking the matrix material after consolidation thereof.

In yet another aspect, the invention provides a method of deforming a composite article comprising a matrix of a thermoplastic material which is reinforced by fibres coated individually or in tows with a support layer, the method comprising heating the article to a temperature above the softening point of the matrix material but at which the support layer is capable of supporting the fibres to prevent them from kinking as the article is deformed, and then deforming the article.

The article of the invention may have an open or a closed cross-section. For example, it may be a sheet or it may be tubular. When tubular, it may have a circular or non-circular (such as oval or rectangular) cross-section.

The article of the invention may be used as a load bearing member such as a beam or strut, or as a conduit for example for fluid; a particularly important application is as a liquid delivery line in a vehicle such as an aircraft where, for reasons of lack of space, it is advantageous to be able to form the conduit into an appropriate configuration. Since the reinforcing fibres are relatively unlikely to kink when the conduit is deformed, it is not necessary to increase the size and therefore weight of the conduit undesirably, as has previously been the case where kinking of the fibres is prevalent. The weight saving is important in aircraft and other similar applications. When in the form of a panel, the article may be used as a load bearing member or may serve an aesthetic function.

The invention will now be described by way of example with reference to the accompanying drawings in which:

FIG. 1 shows a cross-section through a tow of coated fibres for forming a composite article; and FIG. 2 shows a cross-section through a composite article.

Referring to the drawing, FIG. 1 shows a tow 2 of fibres which are coated with a support layer 4 of Nylon 6-6 having a softening point of 260° C. The impregnated tow is surrounded by a layer of matrix material 6 which comprises Nylon 6 having a softening point of 215° C.

A tubular composite article according to this invention may be formed by braiding a plurality of tows of the type shown in FIG. 1. Once braided, the article is subjected to pressure at a temperature between the softening points of the support layer 4 and the matrix material 6 to consolidate the matrix material. The resulting article is shown in cross-section in FIG. 2.

The invention will now be described further with reference to the following examples.

Example 1

A tow consisting of graphite fibres coated with PEEK (APC2 TM), with a cross-section of 2.5×0.15 mm and a fibre content of 62% by volume, was impregnated with polyphenylene sulphone dissolved in an appropriate solvent, and the solvent was evaporated. The resulting impregnated tow consisted of 37.2% fibres, 22.8% PEEK and 40.0% polyphenylene sulphone by volume.

The impregnated tows were braided on a 48 carrier braider to form a tubular article with an internal diameter of 30 mm and a braid angle of 55°. The article was positioned inside a metal tube with an internal diameter of 31 mm, and an inflatable bladder was positioned within the tubular article. The assembly was heated to 300° C., and the bladder was inflated to 413.7 kPa, to consolidate the polyphenylene sulphone.

After cooling the tubular article had a weight of 81 g.m$^{-1}$ and a wall thickness of 0.54 mm. The x-modulus of the article was 50.0 MPa and its y-modulus was 17.5MPa. Its burst pressure was 4.14 MPa.

The tubular article was deformed as follows. Firstly, a helical steel spring, having a diameter approximately the same as the internal diameter of the article was positioned within the article. The article and spring were then placed in an oven heated to 280° C.

After 15 minutes, the article and spring were removed from the oven and bent with a radius of curvature of about 1 m.

After cooling, the spring was removed from within the article which was found to have been deformed without kinking of the fibres. The braid angle of the reinforcing fibres was found to be between 49° and 55°. The burst pressure of the deformed tube was 2.5 MPa which is consistent with the braid angle of 49° without kinking.

Example 2

Tows comprising Victrex TM fibres coated with PEEK (APC2 TM) were braided using a 48 carrier braided to form a tubular article with an internal diameter of 30 mm and a braid angle of 55°.

Prior to consolidation, a film of polyphenylene sulphone of thickness 0.215 mm was positioned between the tubular article and the steel tube, so that when the article was subjected to heat and pressure, the polyphenylene sulphone melted and impregnated the braided coated fibres.

The properties of the resulting article were similar to those produced by the method described in Example 1.

We claim:

1. A composite article comprising continuous, interlaced reinforcing fibers individually coated with an inner support layer of thermoplastic polymeric support material, said coated interlaced reinforcing fibers being embedded within an outer layer of softenable polymeric matrix material, said thermoplastic support material having a softening point which is at least 10° C. higher than that of the matrix material, said interlaced reinforcing fibers being oriented relatively to one another to undergo trellis deformation by shear slipping when the article is deformed and being subject to such trellis deformation by shear slipping when the article is deformed when the polymeric matrix material is in a softened condition and the support layer is unsoftened, the unsoftened support layer providing transverse support for the fibers, thus reducing the tendency of the fibers to kink.

2. A composite article as claimed in claim 1, in which the article is tubular.

3. A composite article as claimed in claim 2, in which the reinforcing fibers are braided.

4. A composite article as claimed in claim 3, in which the matrix material is cross-linked.

5. A composite article as claimed in claim 4, in which the matrix material is a heat recoverable material.

6. A composite article as claimed in claim 3, in which the ratio of the volume of the outer layer to that of the inner layer is less than 50%.

* * * * *